(12) United States Patent
Capomassi et al.

(10) Patent No.: US 8,112,528 B2
(45) Date of Patent: Feb. 7, 2012

(54) MECHANISMS FOR PROVIDING EXCLUSIVE ACCESS TO SHARED RESOURCES IN A DATABASE

(75) Inventors: Alessandro Capomassi, Rome (IT); Domenico Di Giulio, Rome (IT); Eliana Cerasaro, Rome (IT); Silvano Lutri, Rome (IT)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 12/389,336

(22) Filed: Feb. 19, 2009

(65) Prior Publication Data

US 2010/0211682 A1    Aug. 19, 2010

(51) Int. Cl.
*G06F 15/173* (2006.01)
(52) U.S. Cl. ........................ 709/226; 707/704
(58) Field of Classification Search .................. None
See application file for complete search history.

(56) References Cited

U.S. PATENT DOCUMENTS

| | | | |
|---|---|---|---|
| 5,263,155 A | 11/1993 | Wang | |
| 7,739,385 B1 * | 6/2010 | Vinjamuri et al. | 709/226 |
| 7,827,144 B1 * | 11/2010 | Saito et al. | 707/638 |
| 2002/0138483 A1 | 9/2002 | Bretl et al. | |
| 2005/0138375 A1 | 6/2005 | Sadjadi | |
| 2005/0149376 A1 * | 7/2005 | Guyan et al. | 705/9 |
| 2005/0210262 A1 * | 9/2005 | Rolia et al. | 713/182 |
| 2006/0036574 A1 | 2/2006 | Schweigkoffer et al. | |
| 2007/0185834 A1 | 8/2007 | Dunn | |
| 2007/0256078 A1 * | 11/2007 | Falk et al. | 718/104 |

OTHER PUBLICATIONS

Alternative Concurrency Control Methods, Fall 2006, pp. 1-5, http://inst.eecs.berkeley.edu/~cs186/fa06/lecs/21cc3.pdf.*

* cited by examiner

*Primary Examiner* — Ario Etienne
*Assistant Examiner* — Clayton R Williams
(74) *Attorney, Agent, or Firm* — Stephen J. Walder, Jr.; Jeffrey S. LaBaw (57) ABSTRACT

Providing access to a shared resource in a computing environment involves maintaining a timestamp for each shared resource, the timestamp representing the time the resource was last accessed. Then, detecting if the resource is reserved before obtaining access to the resource, by reading the resource timestamp, and if the timestamp represents a future time relative to the current time, indicating that the resource is reserved and delaying access to the resource. If the resource is unreserved, then accessing the resource by reading the resource timestamp to detect any changes in the timestamp since the last reading; if unchanged, then accessing the resource. If the resource is unreserved, then obtaining exclusive access to the resource by reserving the resource by incrementing its timestamp by a reservation period; accessing the resource; and resetting the resource timestamp to the current time.

17 Claims, 5 Drawing Sheets

MECHANISMS FOR PROVIDING EXCLUSIVE ACCESS TO SHARED RESOURCES IN A DATABASE

BACKGROUND

1. Field of the Invention

The invention relates generally to managing access to shared resources and in particular to managing access to shared resources in a database.

2. Background Information

In information technology systems, processes such as software applications that access relational databases typically use either a pessimistic locking approach or an optimistic locking approach in accessing shared data for introducing updates. Both approaches manage concurrent access to shared resources, with different benefits and drawbacks. With pessimistic locking, a process that needs to update a shared resource (such as a row or table in a database) requests an exclusive lock on the resource. The lock can be achieved, for example, that ensures that write access from other processes is denied. The lock manager then reads the resource, applies any required changes/updates and releases the exclusive lock to allow other processes access.

With optimistic locking, instead of exclusively locking the resource, each process reads a timestamp or version number associated with the shared resource. Whatever process changes the state or content of a shared resource, it also raises the version number or updates the timestamp with the current time, so that other processes are notified that a change has been performed, and do not overwrite this change if they find that they are working with an older version of the same resource. Just before applying a change, each process reads the timestamp or version number again and checks it was changed since the first time it was read by that process. If the timestamp or version number has changed (indicating potential changes to the resources other processes), the process gives up the update.

Pessimistic locking is generally utilized for databases exposed to concurrency issues, and it is likely that multiple processes attempt to update the same resource concurrently. Optimistic locking is generally utilized for databases that have low or no concurrency issues, so that it is not worth locking exclusively a resource because most likely there will be no concurrent updates (if concurrency arises, it is acceptable that one of the concurrent processes gives up the update, returns an error message, and tries again later).

A mix of the above approaches has also been utilized, wherein resource locking involves first applying optimistic locking, and if that fails, then switching to applying pessimistic locking.

However, a disadvantage of such approaches is complex. Another disadvantage is that such approaches typically force a process to execute a desired database transaction multiple times. This is unacceptable when a process is also executing other actions (which may be out of the scope of the database), and such actions cannot be undone in pure optimistic locking or done again in the mixed approach.

BRIEF SUMMARY

The invention provides a method and system for providing access to a shared resource in a computing environment. One embodiment involves maintaining a timestamp for each shared resource, wherein the timestamp represents the time the resource was last accessed; and detecting if the resource is reserved before obtaining access to the resource. The detection includes reading the resource timestamp; comparing the resource timestamp to the current time; and if the resource timestamp represents a future time relative to the current time, indicating that the resource is reserved, then delaying access to the resource.

The method may further include: if the resource is not reserved, then obtaining access to the resource by: preparing to access the shared resource; again reading the resource timestamp to detect any changes in the timestamp since the last reading of the timestamp; and if no change detected, then accessing the resource for updating the resource.

The method may further include: if the resource is not reserved, then obtaining exclusive access to the resource by: reserving the resource by incrementing the resource timestamp by a reservation period; accessing the resource for updating the resource; and resetting the resource timestamp to the current time.

The method may further include: periodically extending the duration of the reservation as needed to allow completion of access and update to the reserved resource. Extending the duration of the reservation may include further incrementing the resource timestamp before expiration of the current reservation period. The method may further include progressively reducing the length of the reservation period for each successive reservation extension. The method may further include selecting the reservation period based on historical execution time requirements of a reserving process. The shared resource may include a field of a relational database.

In other embodiments, the invention further provides a system and computer program product implementing said method.

These and other features, aspects and advantages of the invention will become understood with reference to the following description, appended claims and accompanying figures.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for providing exclusive access to shared resources in a database in an information technology (IT) environment. One embodiment comprises providing exclusive access to shared resources in a database that implements optimistic locking. Accordingly, a resource access method for a process, such as a critical process in the IT environment, involves providing that process with exclusive access to a shared resource within an application that implements optimistic locking. The resource access method does not require switching to pessimistic locking. The resources are not locked exclusively. Further, manually unlocking of resources that may have been left in a "locked" state by aborted processes, are dispensed with.

In contrast to optimistic locking, an example resource access method according to the invention utilizes timestamps to mark shared resources in order to allow comparisons, not only between different timestamps, but also with the current time.

Figure 1:
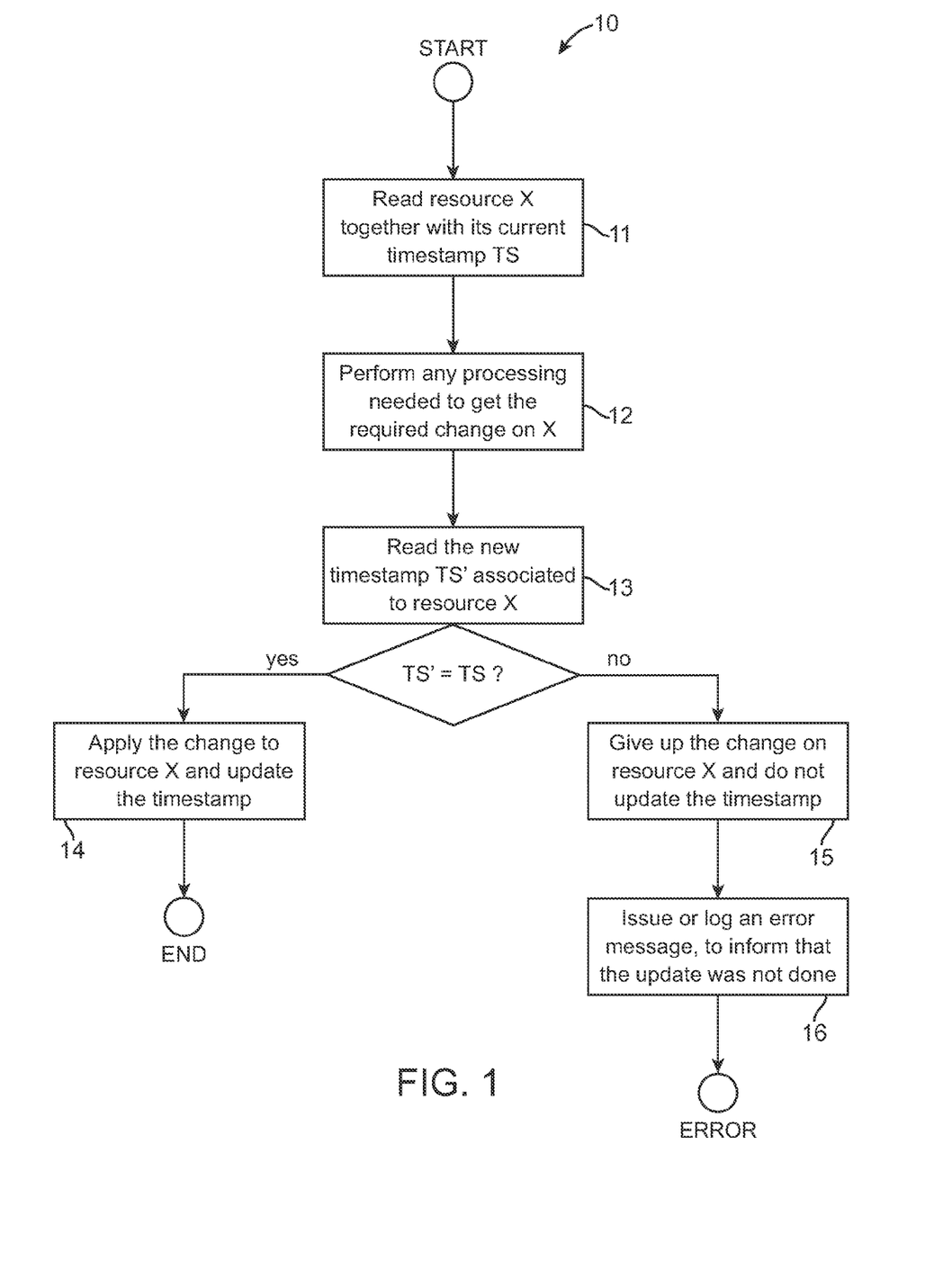
FIG. 1 shows an example process for access to a shared resource in a computing environment.

FIG. 1 shows an example resource access process 10 using optimistic locks for controlling flow of a process A that does not require exclusive access to a share resource. The resource access process 10 includes:

Block 11: Read a shared resource X to be changed (updated), along with current value TS of its timestamp. The timestamp represents the time the resource was last accessed and changed. The timestamp is changed when the resource is updated (not when it is just accessed for reading).

Block 12: Perform any required processing needed to generate the required change to resource X, but do not apply the change to resource X yet.

Block 13: Read a new timestamp value TS' for the resource X, and check if TS and TS' are the same. If yes, proceed to block 14, else proceed to block 15.

Block 14: Apply the change to resource X and update its timestamp. End.

Block 15: Do not apply (i.e., give up) the change to resource X and do not update its timestamp.

Block 16: Issue or log on an error message to inform that the change (update) to resource X was not performed.

Figure 2:
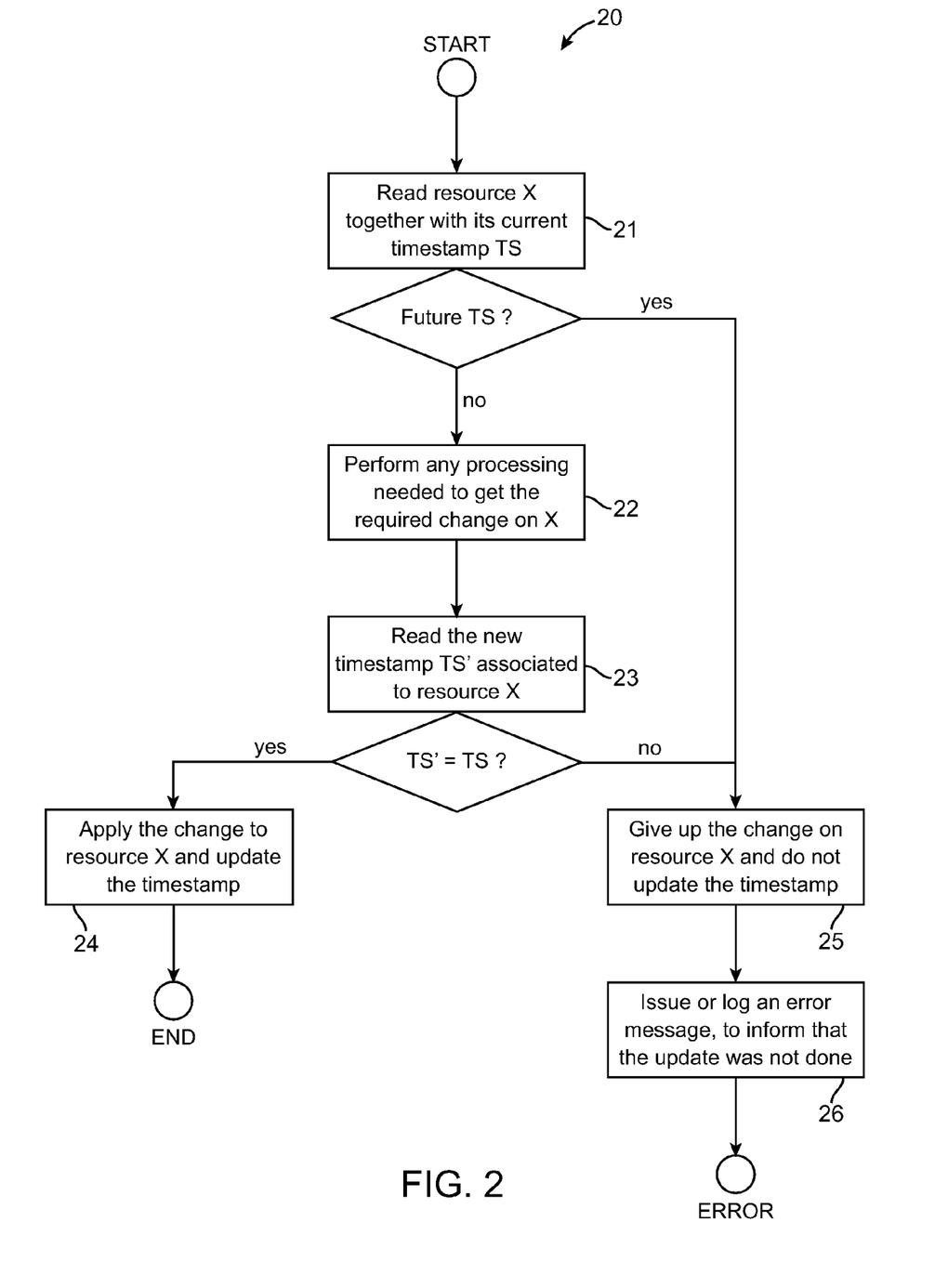
FIG. 2 shows a process for non-exclusive access to a shared resource in a computing environment using a resource reservation scheme, according to an embodiment of the invention.

FIG. 2 shows an example resource access process 20 according to the invention, which avoids use of pessimistic locks, and instead compares the resource timestamp to the current time. The resource access process 20 is applied to a process A that does not require exclusive access to a shared resource (a resource access process for a process that requires exclusive access to a shared resource is described further below). Specifically, the resource access process 20 includes:

Block 21: Read a shared resource X to be changed (updated), along with current value TS of its timestamp. The timestamp represents the time the resource was last accessed (for update), and based on the TS value it can be determined if the resource is already reserved. One example involves determining if TS has a future time value compared to the current time (rather than a past time value). A TS value representing a future time indicates that another process (e.g., a process requiring exclusive access to the resource X), has reserved the resource X for a reserved time period (Δt), as described further below. If not, proceed to block 22, else proceed to block 25.

Block 22: Preparing to access and update the shared resource X. One example involves performing any required processing needed to generate the required change to resource X, but not applying the change to resource X yet.

Block 23: Read a new timestamp value TS' for the resource X, and check if TS and TS' are the same. If yes, proceed to block 24, else proceed to block 25.

Block 24: Apply the change to resource X and update its timestamp. End.

Block 25: Do not apply (i.e., give up) the change to resource X and do not update its timestamp.

Block 26: Issue or log on an error message to inform that the change (update) to resource X was not performed.

After reading the resource timestamp for the first time an additional check is performed in block 21 to ensure that the timestamp value is not in the future with respect to the current time, and if that is the case, the process gives up the change and exits immediately. A TS value representing a future time indicates that another process (e.g., a process requiring exclusive access to the resource X), has reserved the resource X for a reserved time period (Δt). It is the process that requires exclusive access to resource X that updates the timestamp to a value in the future.

When a process requires exclusive access to a resource to perform a critical task (e.g., an operation that cannot be undone or re-applied in a second attempt), a resource access process according to the invention provides such a critical task exclusive access to a shared resource. A critical process that requires an exclusive lock on a shared resource, first reserves the resource for a reservation period (Δt) and then proceeds with changing the resource. In this example, indicating that the resource has been reserved involves incrementing the timestamp of the resource by the amount of the reservation period. When another process reads the timestamp of the resource and compares it to the current time (t), the timestamp has a future time value (i.e., TS>t), indicating that the resource is already reserved and should not be changed. Other methods of reserving the resource and indicating such a reservation may be used.

The critical process then allocates a separate thread for a task of periodically verifying if the reservation period is about to expire and extends it as needed. During the reservation period, all other processes that read the resource (e.g., according to the resource access process 20 of FIG. 2) find a timestamp set in the future (i.e., block 21 in FIG. 2), indicating the resource has been reserved, and give up without changing that shared resource. On the other hand, processes that have read the resource timestamp before it was incremented by Δt cannot verify the timestamp value (i.e., block 23 in FIG. 2) before applying the change, and give up as well (i.e., block 25 in FIG. 2).

The separate thread started by a critical process that reserves the shared resource for exclusive access ensures that the selected reservation period is extended before it expires (i.e., ensures that the timestamp value of that shared resource always has a value ahead of the current time, until the critical task of the critical process involving that shared resource is completed). A separate thread is used because the main thread may be busy performing time-consuming tasks and may not be able to timely extend the reservation period. The separate thread ensures that the reservation period is extended before it expires by slightly anticipating the point in time where the timestamp is incremented with respect to the actual expiration time.

After the critical process that has reserved the shared resource for exclusive access ends its processing and updates the resource, it terminates said separate thread, and resets that shared resource timestamp to the current time so that other processes that read the resource timestamp detect that is it not reserved, and thus attempt to update the resource as described above.

Figure 3:
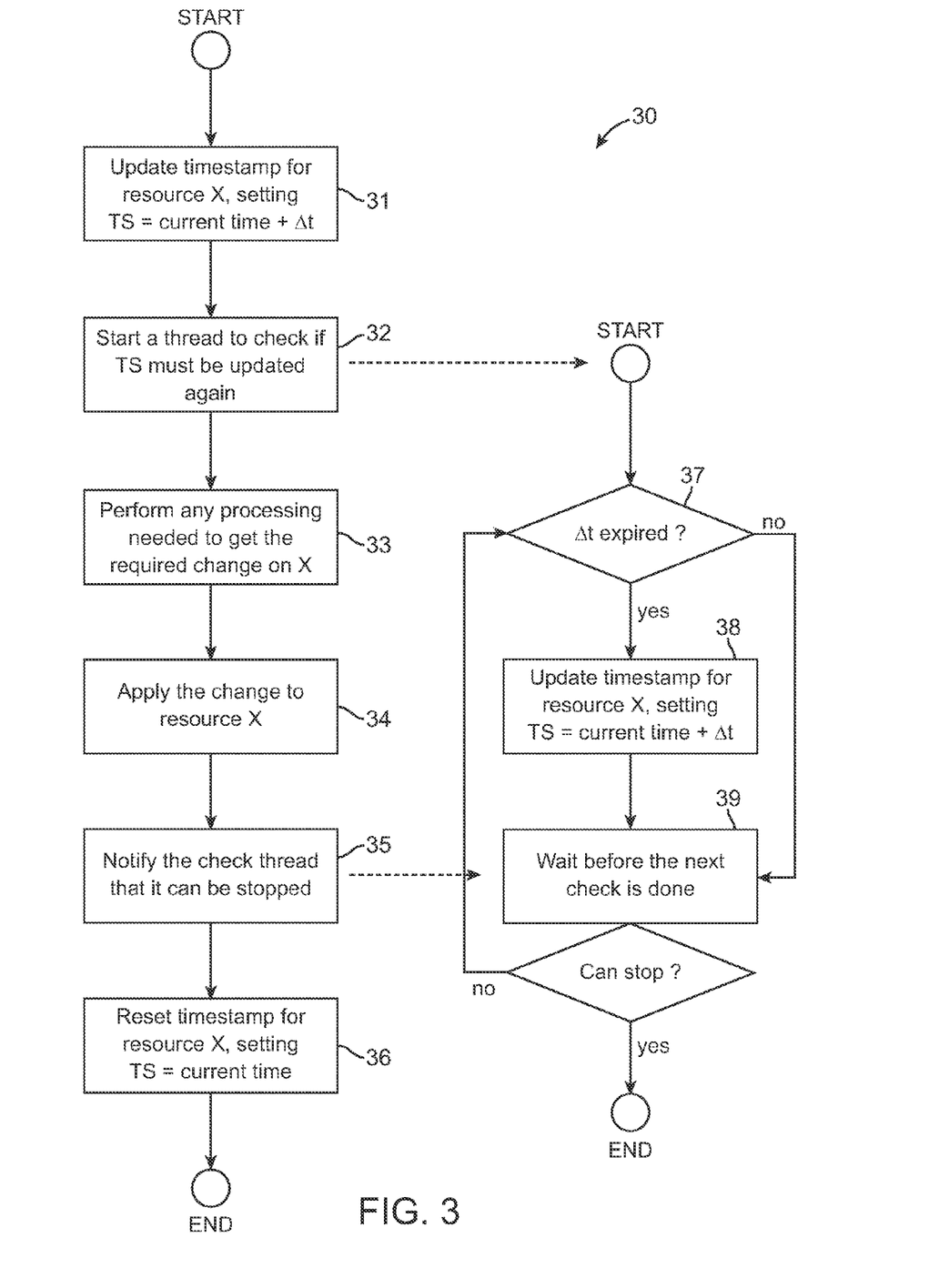
FIG. 3 shows a process for exclusive access to a shared resource in a computing environment using a resource reservation scheme, according to an embodiment of the invention.

FIG. 3 shows an example resource access process 30 according to the invention, which provides a critical process B exclusive access to a shared resource X as described above. Specifically, the resource access process 30 includes:

Block 31: Reserve the shared resource X by updating (i.e., increment) the timestamp for the resource X as TS=t+Δt.

Block 32: Spawn a separate process thread to maintain TS at a future time period (i.e., check if TS needs to be updated again, and does so). The separate thread involves blocks 37-39, described further below.

Block 33: Perform any required processing needed to generate the required change to resource X.

Block 34: Apply the change to resource X.

Block 35: Notify the separate thread that it can terminate updating the timestamp of the shared resource X.

Block 36: Reset timestamp for the resource X to current time (TS=t).

The separate thread for updating the timestamp for resource X includes:

Block 37: Determine if the reservation period Δt has expired. If not, proceed to block 39, else proceed to block 38.

Block 38: Update timestamp for resource X, setting its timestamp to TS=t+Δt.

Block 39: Detect if a notification has arrived to terminate updating the timestamp for resource X to keep it reserved. If not, proceed to block 37, else End separate thread. Detecting the notification to terminate may be performed after a brief time period following block 38.

If resource access process crashes for any reason or fails in resetting the timestamp, the reservation period Δt expires as a matter of course and all other processes can access the resource without requiring manual "unlock" operations.

The reservation period Δt is selected to be short enough to make a reserved shared resource available again when the reserving process aborts. The reservation period Δt is selected long enough to allow the reserving process to complete its task in relation to the reserved resource, without requiring a number of extensions beyond a threshold. For example, the reservation period Δt may be selected as the minimum amount of time required for task completion of a process that requires exclusive access to a shared resource. Historical statistics of past execution for the same process may be used to automatically select Δt according to the average and/or minimum task completion time required in prior executions.

Extensions of this example include an adaptive Δt involving modifying duration of Δt as successive extensions become necessary, progressively reducing the duration of Δt for the additional extensions of time requested at each extension.

Figure 4:
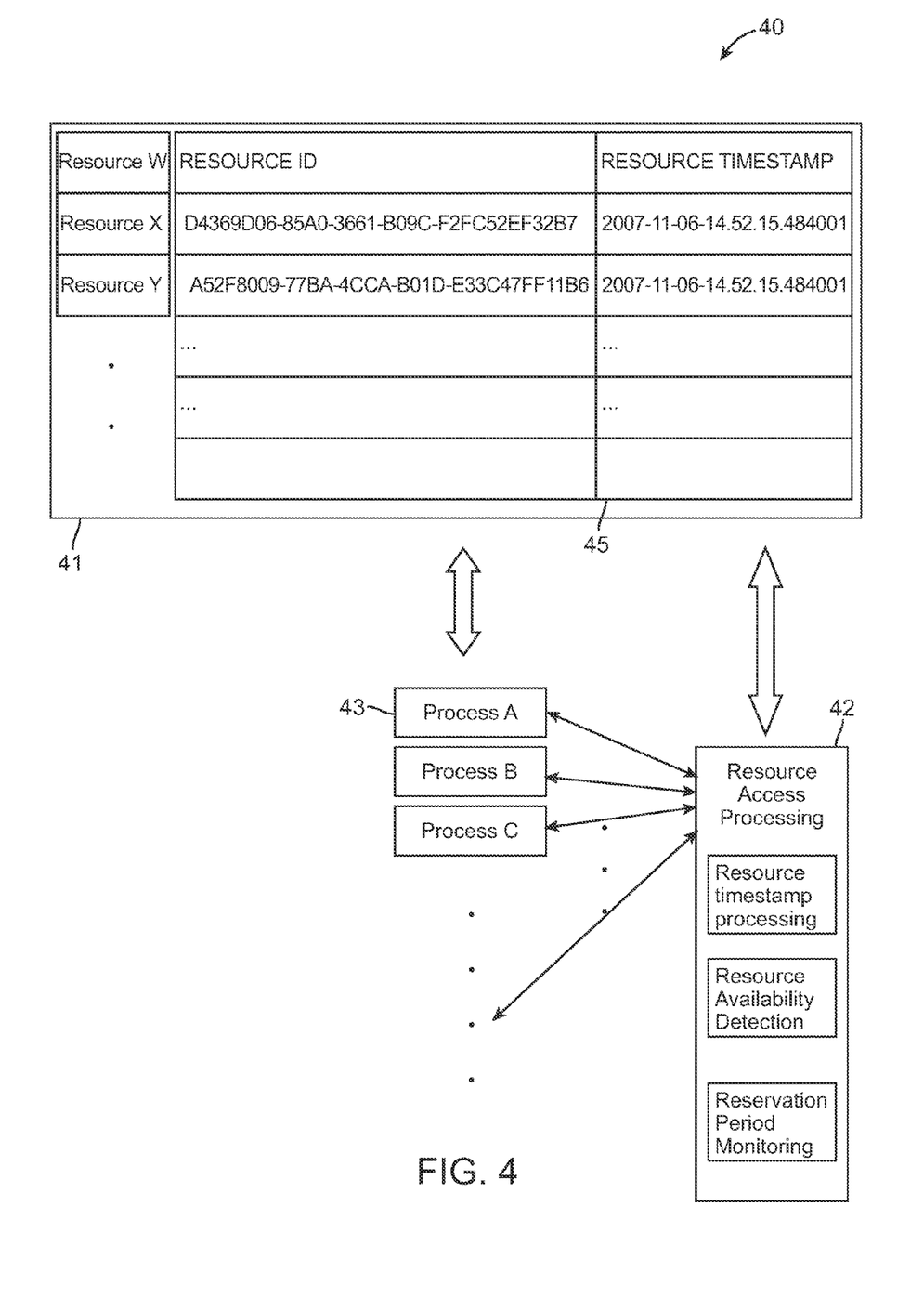
FIG. 4 shows a functional block diagram of a system for access to a shared resource in a computing environment using a resource reservation scheme, according to an embodiment of the invention.

FIG. 4 shows a functional block diagram of a system 40 implementing resource access processing, according to an embodiment of the invention. The system 40 includes a resource module 41 including one or more shared resources (e.g., resources, W, X, Y) and corresponding resource identification and timestamp for each resource. The system further includes a resource access processing module 42 configured to manage access to the resources by one or more processes 43, according to the resource access processes described herein (e.g., FIGS. 1-3). The resource access processing module 42 includes a resource availability detection function that checks if a resource is not reserved before providing access to the resource (FIG. 2) or providing exclusive access to the resource (FIG. 3). The resource access processing module 42 further includes a monitoring function for monitoring the reservation period and extending the duration of the reservation as needed (e.g., as a separate thread described above). The resource access processing module 42 further includes a timestamp processing function which reads resource timestamps, checks timestamp values, updates timestamp values and resets them according to processes described above. The resource access processing module 42 may be a component of each of the one or more of the processes 43, or maybe a standalone module.

In example, the resource module 41 comprises a relational database, where typically the rows of a database table are the resources to be locked. Preferably, a separate table 45 including a one-to-one relationship to the actual table is used to host the timestamps for the resources. Such a table 45 may include a foreign key mapping to the primary key of the actual table, and a timestamp column. The benefit of using a separate table instead of adding the timestamp column to the actual table is that updates to the timestamp values can be performed without blocking reads on the rows of the actual table. This allows a resource access thread to allow exclusive access to the rows of the actual table by updating the timestamps for reserving resources, while the separate checking thread updates timestamps for maintaining reservation periods.

If resource locking is at the level of tables rather than individual rows, a separate table hosting a row for every "lockable" shared resource (i.e., table) may be used to include the timestamp information for each resource. The table includes an identifier and a timestamp for each locked resource. This scheme is scalable to manage locking of resources at different levels as those of ordinary skill in the art will appreciate. Other implementations of the resource access process according to the invention are possible involving resources other than relational databases. The invention is further useful with systems that provide concurrent access to shared resources, while also allowing one of the shared resources to be exclusively accessed by a process without locking the shared resource (i.e., other processes may still read the resource, read its time stamps, etc.) The "without locking" characteristic refers to the fact that the process requiring exclusive access does not require "exclusive lock". Instead, the process reserves the resource for an amount of time. Using time reservation, rather than other locking techniques, avoids manual intervention if the process crashes: a reservation period naturally expires, exclusive locks (whichever they are) must be removed manually if they are not released by their owners. Also, avoiding exclusive locks allows read access by other processes, which depending on the solution chosen for implementing exclusive locks may not be possible.

As is known to those skilled in the art, the aforementioned example architectures described above, according to the invention, can be implemented in many ways, such as program instructions for execution by a processor, as software modules, microcode, as computer program products on computer readable media, as logic circuits, as application specific integrated circuits, as firmware, etc. Further, embodiments of the invention can take the form of an entirely hardware embodiment, an entirely software embodiment or an embodiment containing both hardware and software elements.

Figure 5:
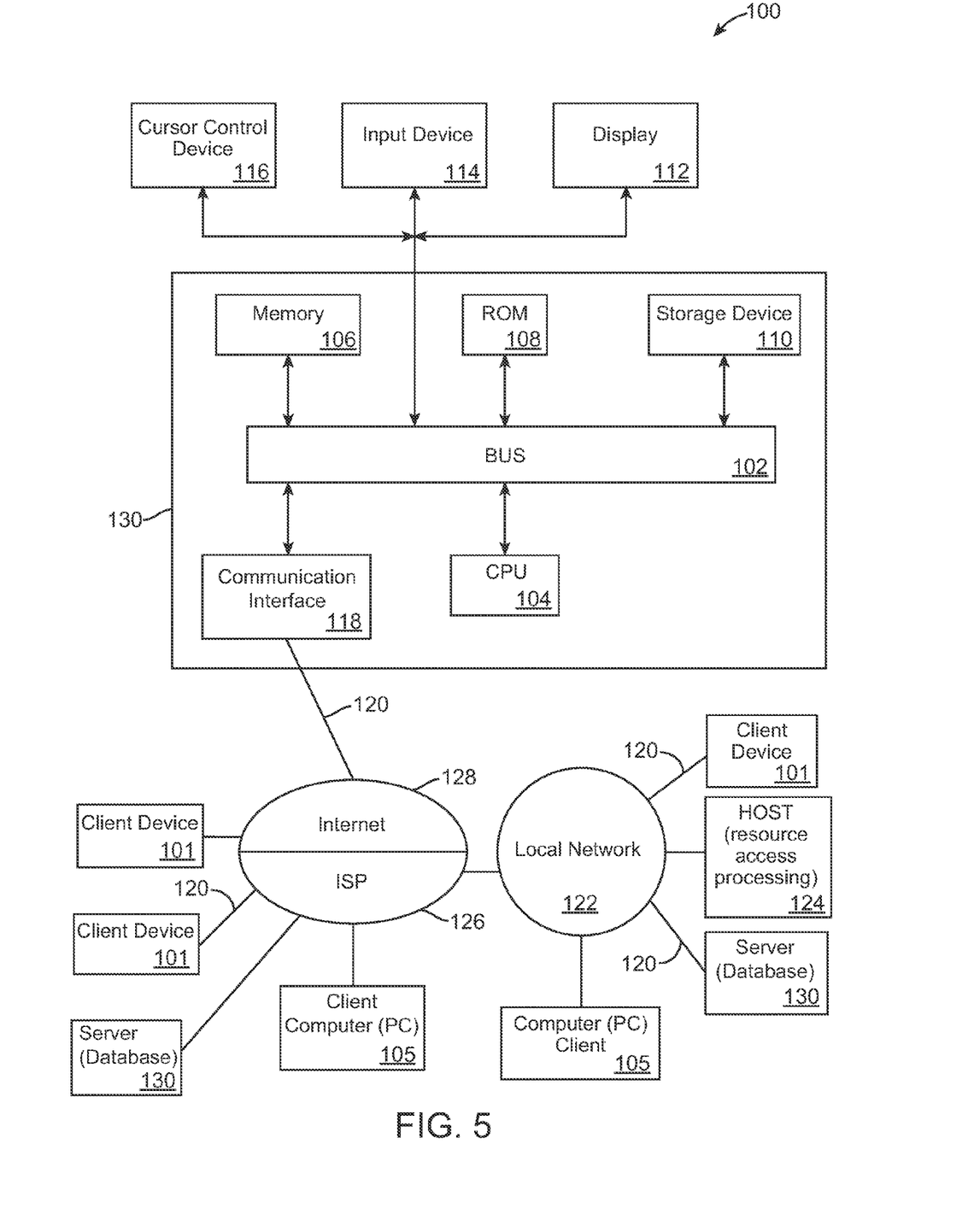
FIG. 5 shows a functional block diagram of an example computing environment implementing an embodiment of the invention.

FIG. 5 shows a functional block diagram of an example architecture of an embodiment of a system 100 configured to perform the processes described above, according to an embodiment of the invention. The system 100 includes one or more client devices 101 connected to one or more server computing systems 130. A server 130 includes a bus 102 or other communication mechanism for communicating information, and a central processing unit (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type of user input device comprises cursor control 116, such as a mouse, a trackball, or cursor direction keys for communicating direction information and command selections to the processor 104 and for controlling cursor movement on the display 112.

According to one embodiment of the invention, the functions of the invention are performed by the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of, or in combination with software instructions to implement the invention. Thus, embodiments of the invention are not limited to any specific combination of hardware circuitry and software.

The terms "computer program medium," "computer usable medium," "computer readable medium," and "computer program product," are used to generally refer to media such as main memory, secondary memory, removable storage drive, a hard disk installed in a hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves, transporting the information.

The server 130 can send/receive messages and data, including e-mail and program code, through the network, the network link 120 and the communication interface 118. Further, the communication interface 118 can comprise a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for providing access to a shared resource in a computing environment, comprising:

maintaining a resource timestamp in association with a shared resource;

receiving a request to access the shared resource;

detecting if the shared resource is reserved before obtaining access to the shared resource, by:

reading the resource timestamp associated with the shared resource;

comparing the resource timestamp to a current time; and in response to the resource timestamp representing a future time relative to the current time, indicating that the shared resource is reserved;

delaying access to the shared resource by a process submitting the request in response to the resource timestamp representing a future time relative to the current time, wherein if the resource timestamp does not represent a future time relative to the current time, then the resource timestamp represents a last time the shared resource was accessed; and in response to the shared resource not being reserved as indicated by the comparison of the resource timestamp to the current time, obtaining exclusive access to the shared resource by:

reserving the shared resource by incrementing the resource timestamp by a reservation period to represent a time in the future relative to a current time; accessing the shared resource for updating the shared resource; and resetting the resource timestamp to a current time in response to completing accessing the shared resource.

2. The method of claim 1 further comprising:

in response to the shared resource not being reserved as indicated by the comparison of the resource timestamp to the current time, obtaining access to the shared resource by:

preparing to access the shared resource;

again reading the resource timestamp to detect any changes in the resource timestamp since the last reading of the resource timestamp; and in response to no change in the resource timestamp being detected since the last reading of the resource timestamp, accessing the shared resource for updating the shared resource.

3. The method of claim 1 further comprising:

periodically extending a duration of the reservation period as needed to allow completion of access and update of the shared resource.

4. The method of claim 3 wherein extending the duration of the reservation period includes further incrementing the resource timestamp before expiration of the reservation period.

5. The method of claim 3 further comprising progressively reducing a length of the extension of the reservation period for each successive reservation extension.

6. The method of claim 1 further comprising selecting the reservation period based on historical execution time requirements of a reserving process.

7. The method of claim 1 wherein the shared resource includes a field of a relational database.

8. A computer program product for providing access to a shared resource in a computing environment, comprising a computer usable medium storage device including a computer readable program including program instructions stored thereon, wherein the computer readable program when executed on a computer causes the computer to:

maintain a resource timestamp in association with a shared resource;

receive a request to access the shared resource;

detect if the shared resource is reserved before obtaining access to the shared resource, by:

reading the resource timestamp associated with the shared resource;

comparing the resource timestamp to a current time; and in response to the resource timestamp representing a future time relative to the current time, indicating that the shared resource is reserved; and delaying access to the shared resource by a process submitting the request in response to the resource timestamp representing a future time relative to the current time, wherein if the resource timestamp does not represent a future time relative to the current time, then the resource timestamp represents a last time the shared resource was accessed; and in response to the shared resource not being reserved as indicated by the comparison of the resource timestamp to the current time, obtaining exclusive access to the shared resource by:

reserving the shared resource by incrementing the resource timestamp by a reservation period to represent a time in the future relative to a current time;

accessing the shared resource for updating the shared resource; and resetting the resource timestamp to a current time in response to completing accessing the shared resource.

9. The computer program product of claim 8 further comprising program instructions for:

obtaining access to the resource, in response to the shared resource not being reserved as indicated by the comparison of the resource timestamp to the current time, obtaining access to the shared resource by:

preparing to access the shared resource;

again reading the resource timestamp to detect any changes in the resource timestamp since the last reading of the resource timestamp; and in response to no change in the resource timestamp being detected since the last reading of the resource timestamp, accessing the shared resource for updating the shared resource.

10. The computer program product of claim 8 further comprising program instructions for:

periodically extending a duration of the reservation period as needed to allow completion of access and update of the shared resource, by incrementing the resource timestamp before expiration of a current reservation period.

11. The computer program product of claim 10 further comprising program instructions for progressively reducing a length of the extension of the reservation period for each successive reservation extension.

12. The computer program product of claim 8 wherein the shared resource includes a field of a relational database.

13. A system for providing access to a shared resource in a computing environment, comprising:

a shared resource;

a storage device for storing a resource timestamp in association with the shared resource; and a resource access module, implemented using at least one processor of the system, and configured for detecting if the shared resource is reserved before providing access to the shared resource, by:

reading the resource timestamp associated with the shared resource;

comparing the resource timestamp to a current time; and in response to the resource timestamp representing a future time relative to the current time, indicating that the shared resource is reserved; and delaying access to the shared resource by a process submitting the request in response to the resource timestamp representing a future time relative to the current time, wherein if the resource timestamp does not represent a future time relative to the current time, then the resource timestamp represents a last time the shared resource was accessed, wherein the resource access module is further configured for:

obtaining exclusive access to the shared resource in response to the shared resource not being reserved as indicated by the comparison of the resource timestamp to the current time, by:

reserving the shared resource by incrementing the resource timestamp by a reservation period to represent a time in the future relative to a current time;

accessing the shared resource for updating the shared resource; and resetting the resource timestamp to a current time in response to completing accessing the shared resource.

14. The system of claim 13 wherein the resource access module is further configured for:

obtaining access to the shared resource, in response to the resource not being reserved as indicated by the comparison of the resource timestamp to the current time, by:

preparing to access the shared resource;

again reading the resource timestamp to detect any changes in the resource timestamp since the last reading of the resource timestamp; and in response to no change in the resource timestamp being detected since the last reading of the resource timestamp, accessing the shared resource for updating the shared resource.

15. The system of claim 13 wherein the resource access module is further configured for:

spawning a monitoring process for periodically extending a duration of the reservation period as needed to allow completion of access and update of the shared resource.

16. The system of claim 15 wherein the resource access module is further configured for:

further incrementing the resource timestamp before expiration of the reservation period.

17. The system of claim 15 wherein the resource access module is further configured for automatically selecting the reservation period based on historical execution time requirements of a reserving process.

* * * * *